(12) United States Patent
Armbrust et al.

(10) Patent No.: US 7,000,992 B2
(45) Date of Patent: Feb. 21, 2006

(54) LOCKING DEVICE FOR A VEHICLE SEAT

(75) Inventors: Karl-Peter Armbrust, Geiselberg (DE); Alexandra Geib, Schwedelbach (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 101 days.

(21) Appl. No.: 10/741,964

(22) Filed: Dec. 19, 2003

(65) Prior Publication Data

US 2004/0130199 A1    Jul. 8, 2004

(30) Foreign Application Priority Data

Dec. 21, 2002 (DE) .............................. 102 60 581

(51) Int. Cl.
*B60N 2/42* (2006.01)

(52) U.S. Cl. .................. 297/378.11; 297/216.1
(58) Field of Classification Search .......... 297/378.11, 297/216.1
See application file for complete search history.

(56) References Cited

U.S. PATENT DOCUMENTS

| | | | |
|---|---|---|---|
| 4,337,978 A | 7/1982 | Kazaoka et al. | |
| 6,540,232 B1 | 4/2003 | Hänsel et al. | |
| 6,598,938 B1 * | 7/2003 | Boltze et al. | ........ 297/378.11 X |
| 2002/0089224 A1 | 7/2002 | Bruck et al. | |

FOREIGN PATENT DOCUMENTS

| | | | | |
|---|---|---|---|---|
| DE | 30 16 036 C2 | 11/1980 | | |
| DE | 83 13 826 U1 | 9/1983 | | |
| DE | 35 11 871 C2 | 10/1985 | | |
| DE | 10135433 A2 * | 7/2001 | ........ | 297/378.11 X |
| DE | 100 18 125 A1 | 10/2001 | | |
| GB | 1106614 | 3/1968 | | |
| GB | 2 156 901 A | 10/1985 | | |

* cited by examiner

Primary Examiner—Anthony D. Barfield
(74) Attorney, Agent, or Firm—Womble Carlyle Sandridge & Rice, PLLC

(57) ABSTRACT

In a locking device (11) for a vehicle seat, in particular for an automobile seat, the locking device includes: a pivotably supported detent pawl (13) which surrounds a first bearing pin (19), a counterpart (20) adapted for moving relative to the first bearing pin and with which the detent pawl (13) cooperates for engaging the locking device (11), and with a movably supported interception element (21) for supporting the detent pawl (13) in the event of a crash. The detent pawl (13) is adapted for pivoting about a pivot pin (15) which is provided on the edge or in the edge region of the detent pawl (13).

21 Claims, 3 Drawing Sheets

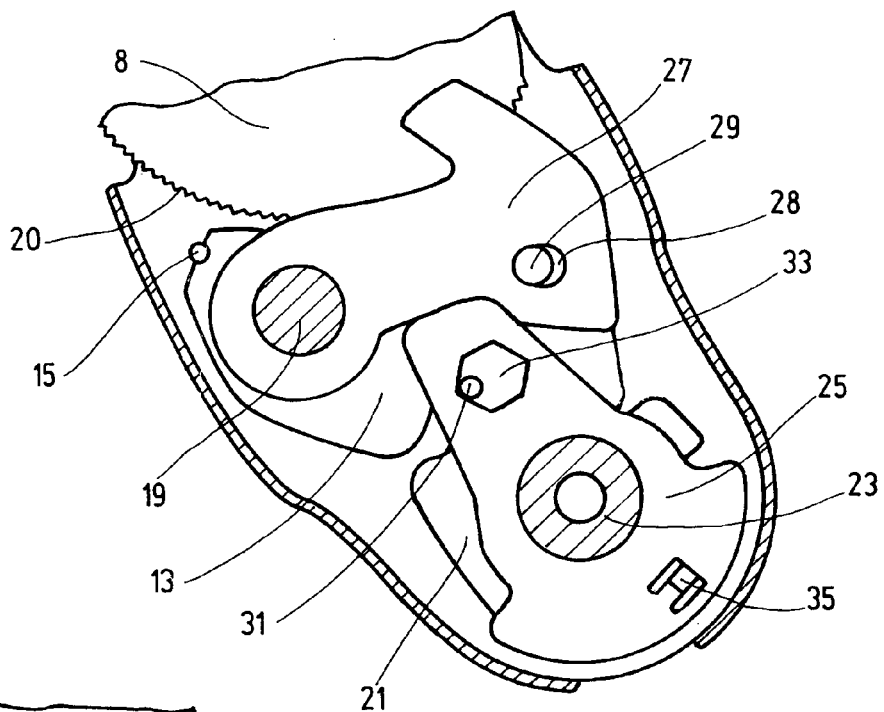
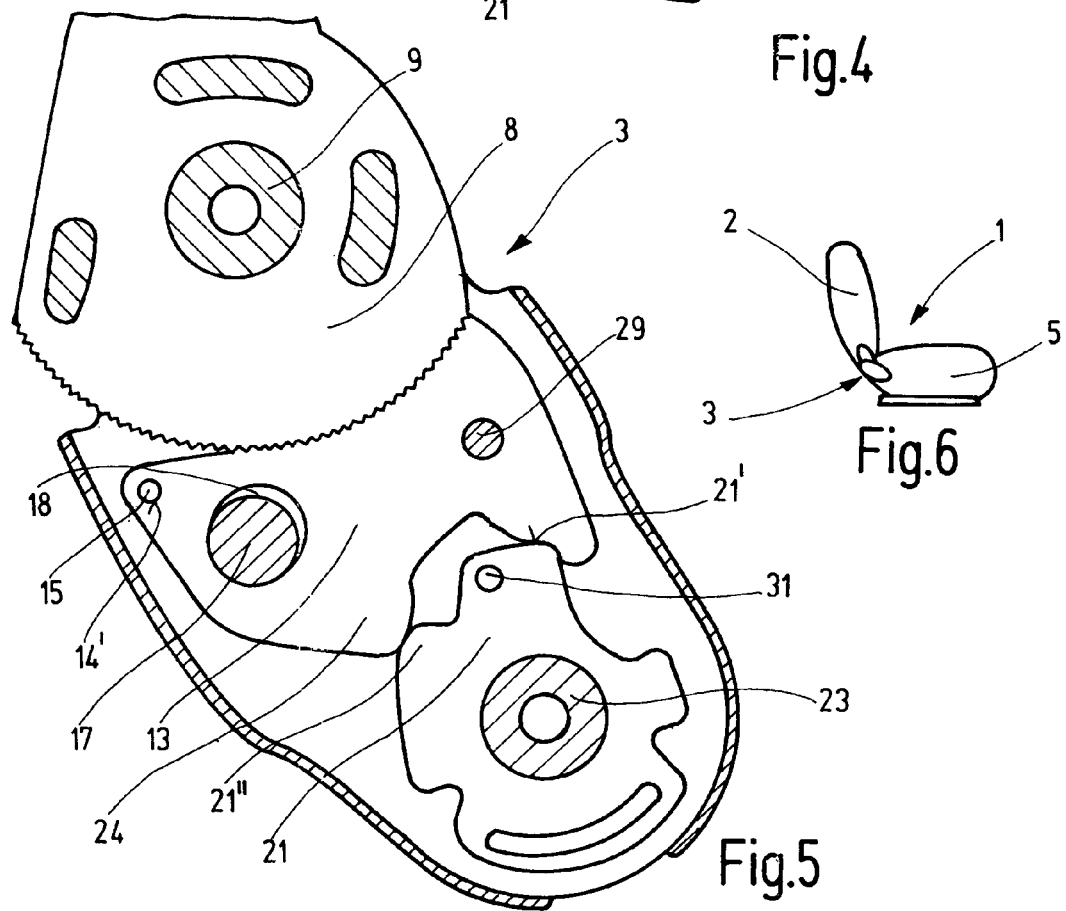

LOCKING DEVICE FOR A VEHICLE SEAT

BACKGROUND OF THE INVENTION

The present invention relates to a locking device for a vehicle seat, in particular for an automobile seat, with the locking device having a pivotably supported detent pawl that surrounds a first bearing pin, a counterpart adapted for moving relative to the first bearing pin and with which the detent pawl cooperates for engaging the locking device, and a movably supported interception element for supporting the detent pawl in the event of a crash.

DE 100 18 125 A1 discloses a fitting with a locking device of the type described above, in which a pivotable detent pawl locks as a counterpart an upper fitting component that is provided with a toothed rim. The addendum and dedendum, which are circles defined by the toothed rim, are curved in concentric relationship about the pivot pin of the upper fitting component. A clamping eccentric indirectly acts upon the detent pawl via a control cam. This makes it possible to construct the detent pawl and an interception element, on the one hand, and the control cam and clamping eccentric, on the other hand, of different sizes for a better absorption of loads. DE 100 18 125 A1 is a member of the same patent family as U.S. Pat. No. 6,540,232, and U.S. Pat. No. 6,540,232 is incorporated herein by reference, in its entirety.

BRIEF SUMMARY OF THE INVENTION

An aspect of the present invention is the provision of improvements to a locking device of the above-described type, with the improvements enabling the locking device to handle higher loads.

In accordance with one aspect of the present invention, a locking device for a vehicle seat, in particular for an automobile seat, has a pivotably supported detent pawl that surrounds a first bearing pin, a counterpart adapted for moving relative to the first bearing pin and with which the detent pawl cooperates for engaging the locking device, and a movably supported interception element for supporting the detent pawl in the event of a crash. In accordance with this aspect, the detent pawl is adapted for pivoting about a pivot pin that is provided on the edge or in the edge region of the detent pawl.

As a result of making the detent pawl pivotable about a pivot pin which is provided on the edge or in an edge region of the detent pawl, the pivot of the detent pawl is relocated to the edge of the detent pawl away from the first bearing pin, which is designed for absorbing loads in the event of a crash, and therefore supports the detent pawl in the event of a crash. In comparison with a detent pawl that is pivotably supported in a known manner on the first bearing pin, and has a limited number of teeth because of the concave shape of the detent pawl in the region of the toothed rim and because of the relative movement of the detent pawl and the counterpart, it is possible to provide the detent pawl with a larger number of teeth or a longer toothed rim because of the relocation of the pivot, without having interferences between the toothed rims resulting from the relative movement. As a result, it is possible to increase the maximum load capacity. Preferably for this reason, the toothed rim is also formed in the region between the first bearing pin and the counterpart. For its mobility, the detent pawl preferably includes, for surrounding the first bearing pin, a guide slot, i.e., the first bearing pin extends through this guide slot of the detent pawl. The guide slot curves partially around the pivot pin in the shape of a circular arc.

For absorbing loads, the diameter of the large-dimensioned, first bearing pin is substantially larger than the diameter of the pivot pin. The pivot pin can have small dimensions because of its small load absorption. Accordingly, a pivotably supported, biased interception element supports the detent pawl in the event of a crash preferably not only at the end facing away from the pivot pin, but also approximately in the region of the first bearing pin. Preferably, the pivot pin and the first bearing pin are arranged at an unvarying distance and in a stationary manner relative to each other, and preferably on the same component, for example, a component of the fitting, which preferably also mounts the interception element.

Basically, the interception element alone is capable of securing the locked condition, for example, when the spacing between the detent pawl and the interception element is clearly smaller than the depth of the teeth of the toothed rim of the detent pawl and the counterpart, or when the detent pawl is biased. However, it is preferred to provide a pivotably supported, biased clamping eccentric, which biases the detent pawl at least indirectly in the direction toward the counterpart for engaging the locking device. For a compact construction, the interception element and the clamping eccentric may be mounted and coupled with each other on a common second bearing pin. Preferably, the detent pawl is indirectly biased, via a control cam. The control cam is preferably mounted on the first bearing pin and is connected to the detent pawl, for example, via a slot-pin link, and the control cam is biased by the clamping eccentric for engaging the locking device.

The locking device of the invention may be used not only in fittings, for example, backrest adjusters, but also in backrest locks, floor locking devices, or the like.

BRIEF DESCRIPTION OF THE DRAWINGS

In the following, the invention is described in greater detail with reference to an embodiment, including a modification, shown the drawings, in which:

FIG. 4 is a sectional view corresponding to FIG. 3 and in a disengaged state;

FIG. 5 is a sectional view of a modification corresponding to FIG. 1; and

FIG. 6 is schematic view of a vehicle seat.

DETAILED DESCRIPTION OF THE INVENTION

Figure 1:
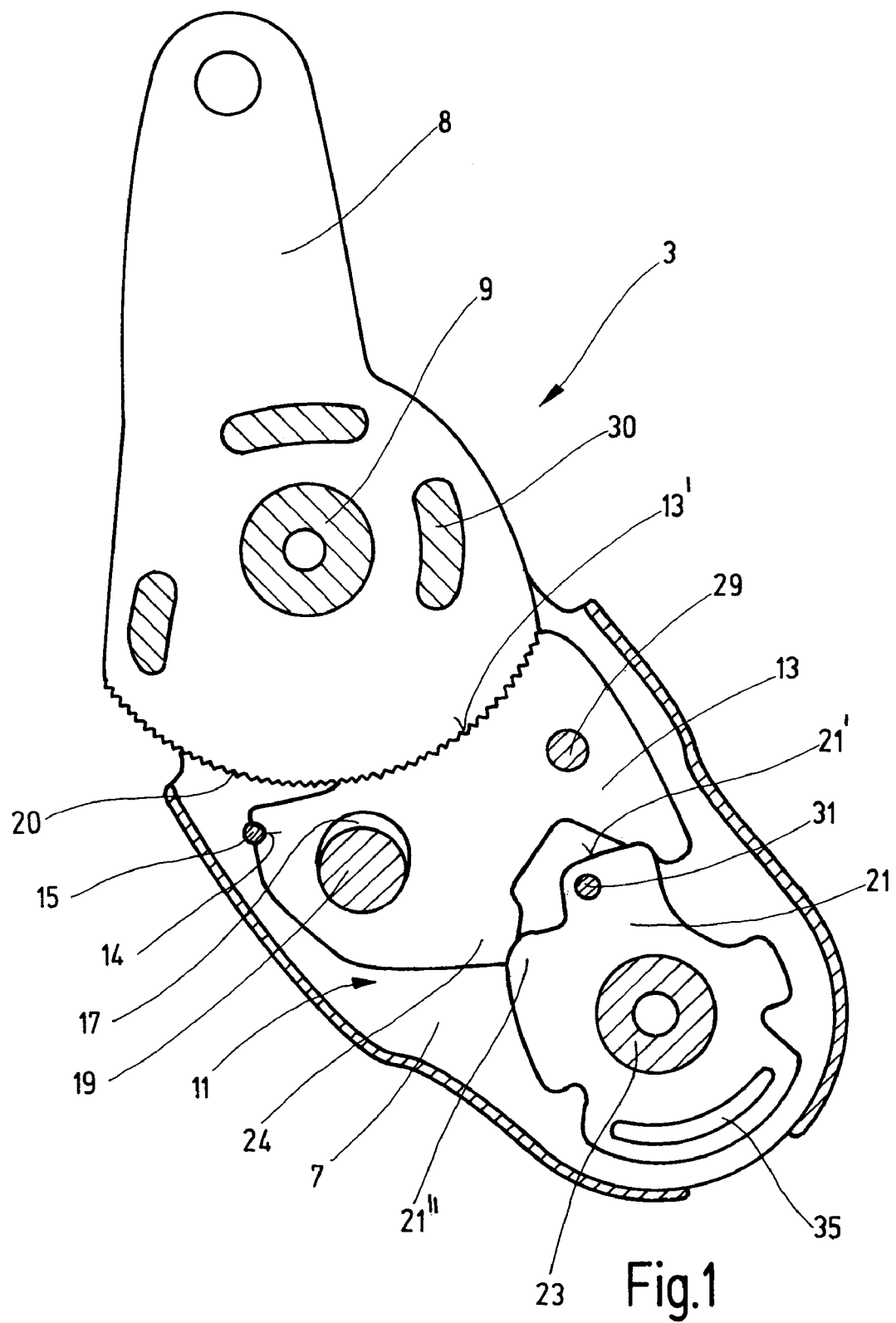
FIG. 1 is an axially sectioned view of a fitting in the plane of a detent pawl of an exemplary locking device in an engaged state.
Figures 2, 3:
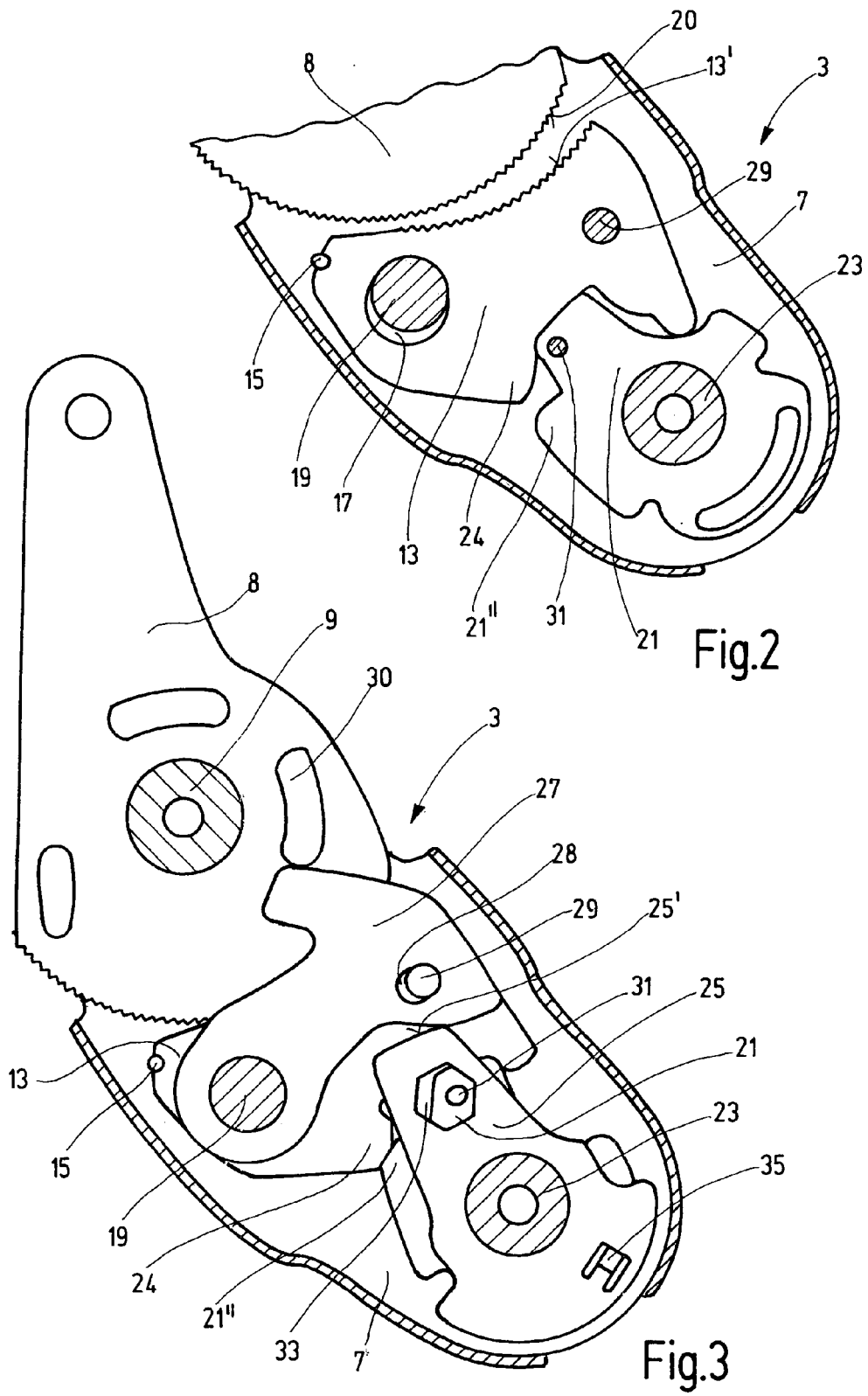
FIG. 2 is a sectional view corresponding to FIG. 1 in a disengaged state.
FIG. 3 is an axially sectioned view of the fitting of FIG. 1 in the plane of a control cam and in an engaged state.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

In a vehicle seat 1 of a rear seat row of an automobile, a backrest 2 is mounted, on each seat side by means of a fitting 3, to a seat 5. The backrest 2 is adapted for pivoting relative to the seat 5. Each fitting 3 includes a lower fitting component 7 secured to the seat and an upper fitting component 8 secured to the backrest. The upper fitting component 8 is adapted for pivoting relative to the lower fitting component 7 about a backrest pin 9. The lower fitting component 7 is constructed as a hollow, largely closed casing, which accommodates a locking device 11 of the fitting 3.

The locking device 11 comprises a detent pawl 13 that is supported at one end on its edge by means of a semicircular, half open receptacle 14 on a small pivot pin 15. Farther in the interior of the detent pawl 13, but still in the vicinity of the receptacle 14, the detent pawl 13 comprises a guide slot 17 that curves in the shape of a circular arc partially around the pivot pin 15, and surrounds a first bearing pin 19. The first bearing pin 19, which is arranged on the lower fitting component 7 parallel to the backrest pin 9, defines the directional indications that are used in the following. The pivot pin 15 defines the pivot of the detent pawl 13, whereas the first bearing pin 19 is designed for absorbing a load. Consequently, the diameter of the first bearing pin 19 is substantially larger than the diameter of the pivot pin 15.

On a concavely curved side, the detent pawl 13 mounts a toothed rim 13'. In the engaged state (i.e., locked state) of the locking device 11, the toothed rim 13' meshes with a toothed rim 20 that convexly curves around the backrest pin 9 (i.e., with respect to the addendum and dedendum circles of the teeth). This toothed rim 20 is formed on the upper fitting component 8 as a counterpart to the detent pawl 13. As a result of arranging the pivot of the detent pawl 13 at the edge, it is possible to form the toothed rim 13' over nearly the entire length of the detent pawl 13, i.e., also in the region between the first bearing pin 19 and the toothed rim 20.

To support the detent pawl 13 in the event of a crash, a spring-loaded interception element 21 is provided. The interception element 21 is pivotably mounted on a second bearing pin 23 parallel to the first bearing pin 19 and secured to the lower fitting component. The interception element 21 is arranged in a common plane with the detent pawl 13. In the engaged state of the locking device 11, an interception surface 21' of the interception element 21 is in the direct vicinity of the side of detent pawl 13 facing away from the toothed rim 13', more specifically at a distance which is smaller than the tooth depth of the toothed rim 13'. In spaced relationship from the interception surface 21', i.e., closer to the first bearing pin 19, the interception element 21 mounts a support cam 21", which is likewise arranged at a short distance from the detent pawl 13, namely in the direct vicinity of a nose 24 of the detent pawl 13.

Beside the interception element 21, i.e., in a plane parallel thereto, the second bearing pin 23 mounts a spring-loaded clamping eccentric 25. In the engaged state, the clamping eccentric 25 acts with a clamping surface 25', that is curved in eccentric relationship with the second bearing pin 23, upon a control cam 27 arranged in the same plane as the clamping eccentric 25.

In the axial direction in offset relationship with the detent pawl 13, the control cam 27 is pivotably supported on the first bearing pin 19. An elongate hole 28 of the control cam 27 surrounds a cylindrical pin 29 that projects from the detent pawl 13 parallel to the first bearing pin 19. The elongate hole 28 and the pin 29 serve to couple the pivotal movements of the detent pawl 13 and the control cam 27 that are performed about different pivots. To control the engagement of the detent pawl 13, the control cam 27 is able to cooperate via a control finger with control elements 30 that are provided on the upper fitting component 8. In the engaged state, the clamping eccentric 25 pushes, via control cam 27 and pin 29, the detent pawl 13 in its pivoting direction into the toothed rim 20 in the region of the portion of the toothed rim 13' that is distant from the first bearing pin 19.

The interception element 21 mounts an unlocking pin 31 that projects parallel to the second bearing pin 23. On the one side, the unlocking pin 31 extends outward through a guide slot of the lower fitting component 7. On the other side, it is surrounded by a larger window 33 of the clamping eccentric 25. The interception element 21 and the clamping eccentric 25 are coupled for a second time by a slot-pin link 35 radially opposite to the window 33.

For disengaging the locking device 11 and thus the fitting 3, the unlocking pin 31 is pivoted by an externally engaging cable line or the like, thereby entraining the interception element 21 and likewise the clamping eccentric 25, after the unlocking pin 31 comes into contact with the edge of the window 33. In the drawing, this pivotal movement occurs counterclockwise. The movement of the interception element 21 causes the possible pivoting range of the detent pawl 13 to become larger, while the clamping eccentric 25 releases the control cam 27.

As a result of contacting the nose 24 of the detent pawl 13, the interception element 21 is able to pivot open the detent pawl 13, i.e., to pivot about pin 15. In so doing, the end of the guide slot 17, which is the lower one in the drawing, removes itself from the first bearing pin 19, and the end of the guide slot 17, which is the upper one in the drawing, comes into contact with the first bearing pin 19. At the same time, the pin 29 moves from the end of elongate hole 28 that lies radially outward in the drawing, toward the end of the elongate hole 28 that lies radially inward in the drawing. As a result of its movement, the detent pawl 13 totally removes itself from the toothed rim 20. It is now possible to pivot the upper fitting component 8, and thus the backrest 2, to a different position.

To engage the locking device 11, the unlocking pin 31 is released. Because of spring loads, the interception element 21 and the clamping eccentric 25 pivot to their securing or engaging position. Via its clamping surface 25' in contact with the control cam 27, and furthermore via the pin 29, the clamping eccentric 25 exerts a closing moment on the detent pawl 13, which performs a pivoting movement toward the toothed rim 20, until fully engaging it.

In the event of a crash, it is still possible to push the clamping eccentric 25 in the direction of disengagement via the upper fitting component 8, the detent pawl 13, and the control cam 27. However, the detent pawl 13 will move only until it contacts the interception element 21, i.e., the interception surface 21' and the support cam 21" thereof.

In a modification as shown in FIG. 5, a receptacle 14' for the pivot pin 15 is made circular and formed within the edge region of the detent pawl 13. Otherwise, the operating method and the characteristics, in particular the long toothed rim 13', are the same as in the described embodiment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A locking device for a vehicle seat, with the locking device operating advantageously in the event of a crash, and the locking device comprising:
   a detent pawl having an edge and an edge region, wherein the detent pawl surrounds a bearing pin;
   a counterpart mounted for moving relative to the bearing pin that is surrounded by the detent pawl, wherein the detent pawl is mounted for pivoting about a pivot pin into and out of engagement with the counterpart, and the pivot pin is positioned at the edge of the detent pawl or in the edge region of the detent pawl; and
   a movably mounted interception element for holding the detent pawl in engagement with the counterpart in the event of the crash, with the locking device being in a locked state while the detent pawl is in engagement with the counterpart,
   wherein the detent pawl includes a guide slot that extends around the bearing pin, and the guide slot is larger than the bearing pin so that the detent pawl can move relative to the bearing pin.

2. A locking device according to claim 1, wherein the guide slot is in the shape of a circular arc which curves partially around the pivot pin.

3. A locking device according to claim 2, wherein the bearing pin has a diameter that is substantially larger than a diameter of the pivot pin.

4. A locking device according to claim 3, wherein the detent pawl includes a toothed rim, the toothed rim is in engagement with the counterpart while the locking device is in the locked state, and the toothed rim extends into a region of the detent pawl which is between the bearing pin and the counterpart.

5. A locking device according to claim 4, wherein:
   the interception element is in an intercepting configuration when the interception element is holding the detent pawl in engagement with the counterpart;
   the interception element is mounted for moving into and out of the intercepting configuration;
   the interception element is biased toward the intercepting configuration; and
   in the event of the crash occurring while the interception element is in the intercepting configuration, the interception element engages:
      a portion of the detent pawl that is proximate the bearing pin, and
      an end of the detent pawl which faces away from the pivot pin.

6. A locking device according to claim 5, wherein:
   the detent pawl is in an engaging configuration while the detent pawl is in engagement with the counterpart; and
   the locking device further comprises a pivotably mounted clamping eccentric which is biased and at least indirectly acts upon the detent pawl in a manner so that the detent pawl is biased toward the engaging configuration.

7. A locking device according to claim 6, wherein:
   the bearing pin is a first bearing pin;
   the interception element is pivotably mounted on a second bearing pin;
   the clamping eccentric is also pivotably mounted on the second bearing pin; and
   the interception element and the clamping eccentric are coupled with each other.

8. A locking device according to claim 7, further comprising a control cam which is pivotably mounted to the first bearing pin and is coupled to the detent pawl by way of a slot and pin, wherein the clamping eccentric acts upon the detent pawl by way of the control cam so that the detent pawl is biased toward the counterpart.

9. A locking device according to claim 2, wherein the detent pawl includes a toothed rim, the toothed rim is in engagement with the counterpart while the locking device is in the locked state, and the toothed rim extends into a region of the detent pawl which is between the bearing pin and the counterpart.

10. A locking device according to claim 2, wherein:
    the interception element is in an intercepting configuration when the interception element is holding the detent pawl in engagement with the counterpart;
    the interception element is mounted for moving into and out of the intercepting configuration;
    the interception element is biased toward the intercepting configuration; and
    in the event of the crash occurring while the interception element is in the intercepting configuration, the interception element engages:
       a portion of the detent pawl that is proximate the bearing pin, and
       an end of the detent pawl which faces away from the pivot pin.

11. A locking device according to claim 1, wherein the bearing pin has a diameter that is substantially larger than a diameter of the pivot pin.

12. A locking device according to claim 1, wherein the detent pawl includes a toothed rim, the toothed rim is in engagement with the counterpart while the locking device is in the locked state, and the toothed rim extends into a region of the detent pawl which is between the bearing pin and the counterpart.

13. A locking device according to claim 1, wherein:
    the interception element is in an intercepting configuration when the interception element is holding the detent pawl in engagement with the counterpart;
    the interception element is mounted for moving into and out of the intercepting configuration;
    the interception element is biased toward the intercepting configuration; and
    in the event of the crash occurring while the interception element is in the intercepting configuration, the interception element engages:
       a portion of the detent pawl that is proximate the bearing pin, and
       an end of the detent pawl which faces away from the pivot pin.

14. A locking device according to claim 1, wherein:
    the detent pawl is in an engaging configuration while the detent pawl is in engagement with the counterpart; and
    the locking device further comprises a pivotably mounted clamping eccentric which is biased and at least indirectly acts upon the detent pawl in a manner so that the detent pawl is biased toward the engaging configuration.

15. A locking device according to claim 14, wherein:
    the bearing pin is a first bearing pin;
    the interception element is pivotably mounted on a second bearing pin;
    the clamping eccentric is also pivotably mounted on the second bearing pin; and
    the interception element and the clamping eccentric are coupled to one another.

16. A locking device according to claim 14, further comprising a control cam which is pivotably mounted to the bearing pin and is coupled to the detent pawl, wherein the clamping eccentric acts upon the detent pawl by way of the control cam so that the detent pawl is biased toward the engaging configuration.

17. A locking device according to claim 16, wherein the control cam is coupled to the detent pawl by way of a slot and a pin.

18. A locking device according to claim 1, wherein the locking device is in combination with a fitting for the vehicle seat, and wherein:
   the fitting comprises a lower component and an upper component mounted for pivoting relative to the lower component of the fitting;
   the bearing pin is provided on the lower component of the fitting, and
   the counterpart is provided on the upper component of the fitting.

19. A combination according to claim 18, wherein the combination is further in combination with the vehicle seat, and wherein:
   the upper component of the fitting is mounted to a backrest portion of the vehicle seat; and
   the lower component of the fitting is mounted to a seat portion of the vehicle seat.

20. A locking device according to claim 1, wherein:
   the bearing pin is a first bearing pin;
   the interception element is pivotably mounted on a second bearing pin;
   the locking device further includes a clamping eccentric that is also pivotably mounted on the second bearing pin; and
   the interception element and the clamping eccentric are coupled with each other.

21. A locking device according to claim 20, further comprising a control cam which is pivotably mounted to the first bearing pin and is coupled to the detent pawl by way of a slot and pin, wherein the clamping eccentric acts upon the detent pawl by way of the control cam so that the detent pawl is biased toward the counterpart.

* * * * *